Sept. 22, 1970 P. K. HSIEH ET AL 3,530,445

RANDOM ACCESS MEMORY WITH QUIET DIGIT-SENSE SYSTEM

Filed Sept. 6, 1968 2 Sheets-Sheet 1

INVENTORS
PETER K. HSIEH &
DAVID BENIMA

BY Carl V. Olson
ATTORNEY

Sept. 22, 1970 P. K. HSIEH ET AL 3,530,445

RANDOM ACCESS MEMORY WITH QUIET DIGIT-SENSE SYSTEM

Filed Sept. 6, 1968 2 Sheets-Sheet 2

INVENTORS
PETER K. HSIEH &
DAVID BENIMA

BY Carl V. Olson
ATTORNEY

3,530,445
RANDOM ACCESS MEMORY WITH QUIET DIGIT-SENSE SYSTEM

Peter K. Hsieh and David Benima, Camden, N.J., assignors to RCA Corporation, a corporation of Delaware Filed Sept. 6, 1968, Ser. No. 758,024
Int. Cl. G11c *7/02*
U.S. Cl. 340—174 15 Claims

ABSTRACT OF THE DISCLOSURE

A random-access magnetic memory of a type in which the conductors used during read-out for sensing stored information are also used during write-in for digit or inhibit pulses. Digit-sense conductors are arranged in pairs. The two conductors of a pair have a common terminated end and separate drive-sense ends. A first impedance having a value equal to one-half the characteristic impedance of one conductor is connected from the common terminated end of each pair to a point of reference potential. A second impedance, having a centertap and having a total value equal to twice the characteristic impedance of one conductor, is connected between the separate drive-sense ends of each pair. Digit drive means is connected for supplying balanced push-pull digit drive current pulses to the drive-sense ends of the two conductors of digit-sense conductor pairs. Each of a plurality of differential sense amplifiers has two inputs connected to centertaps of second impedances of two respective digit-sense conductor pairs. The described digit-sense system is shown in 2D, 2½D 2-wire, 3D 3-wire and 2D two-element-per-bit memory organizations.

BACKGROUND OF THE INVENTION

The maximum speed of operation of random-access magnetic core memories is affected by the size of the individual magnetic cores, and by the noise disturbances in the memory. Memories are made using cores as small as can be threaded with wires, in order to take advantage of the speed and economy with which they can be switched. The minimum practical size of the cores used is thus affected by the number of wires which must be passed through each core. Some memory organizations minimize the number of wires through each core by utilizing one set of wires for two purposes. That is, the set of conductors used during read-out for sensing stored information is also used during write-in for digit or inhibit pulses. Other types of magnetic memories, such as thin film and plated wire memories, also may be similarly organized. However, when one set of conductors is used for two purposes, the noise disturbances in the memory are more serious and they limit the speed at which the memory can be operated.

SUMMARY OF THE INVENTION

It is an object of this invention to provide an improved random-access magnetic memory in which the same set of conductors is used for both sensing and digiting (or inhibiting), and in whcih the digit-sense portion of the memory is organized to minimize noise disturbances in the memory. Digit-sense conductors are arranged in pairs. Each pair is driven in balanced push-pull fashion from one end, the other end of each pair being connected through an impedance to a point of reference potential. One input of a differential sense amplifier is connected to a centertap of an impedance connected across the driven end of the driven end of the digit-sense conductor pair. The other input of the differential sense amplifier is connected to a point of reference potential, or is connected to the centertap of the impedance of another digit-sense conductor pair. Word lines are arranged and driven to provide a memory of the 2D type, the 2½D 2-wire type, or the 3D 3-wire type.

Figure 1:
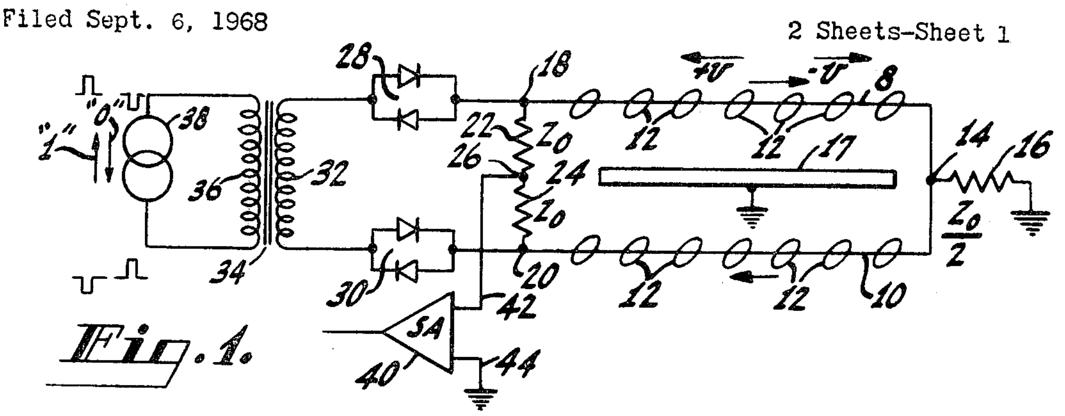
FIG. 1 is an elemental digit circuit including a digit-sense conductor pair, together with driving and sensing means, for use in a random-access magnetic memory.

Reference is now made to FIG. 1 wherein there is shown a digit-sense conductor pair 8, 10 linking a plurality of memory elements or magnetic cores 12. The two conductors of the pair 8, 10 are arranged in close proximity to a conductive ground plane 17 connected to a point of reference potential such as ground. The conductors may be on opposite sides of plane 17 as shown, or may be on the same side. The cores 12 are also linked by word conductors (not shown) which are arranged in accordance with the particular type of memory organization employed, as will be described in connection with FIGS. 2 through 6. The two conductors 8, 10 have a common terminated end 14 connected through an impedance 16 to a point of reference potential such as ground. The terminating impedance 16 has a value $Z_0/2$, where $Z_0$ is the characteristic impedance of an individual one of the conductors 8, 10 with respect to the ground plane 17, or with respect to system ground if plane 17 is omitted. The conductors 8, 10 have separate respective drive-sense ends 18 and 20 which are connected together through series impedances 22 and 24 having a centertap 26. Each impedance 22, 24 has a value equal to $Z_0$.

The drive-sense ends 18, 20 of the conductor pair 8, 10 are each connected through respective diode circuits 28 and 30 to the ends of a secondary coil 32 of a transformer 34. Each diode circuit 28, 30 includes two parallel-connected, oppositely-poled uni-directional conduction devices or diodes. The diode circuits permit current conduction in either direction between the transformer secondary 32 and the conductor pair 8, 10. The diode circuits 28, 30 are included for the purpose of direct current restoration of the transformer 34 to prevent a building up of voltage on the conductors when a succession of pulses of the same polarity is applied to the conductor pair 8, 10. One of the circuits 28 and 30 is sufficient for this purpose, but the inclusion of both of the circuits 28 and 30 is preferred for the purpose of insuring perfect symmetry and balance in the digit-sense system.

The transformer 34 includes a primary coil 36 which is connected to a current driver 38. The transformer 34 and the current driver 38 are constructed and connected in any conventional manner to deliver balanced push-pull pulses to the terminals 18, 20 of the conductor pair. In some applications it is also necessary that driver 38 be a bidirectional driver capable of delivering push-pull pulses of one or the other polarity to terminals 18, 20, depending on whether the information bit to be written is a "1" or a "0." It is important that the current driver 38 appear as a high impedance source when viewed from the terminals 18, 20 of the conductor pair 8, 10. This is because the impedance reflected by the source is in shunt or in parallel with the impedance of resistors 22 and 24. The source impedance should be sufficiently high to not significantly decrease the impedance between terminals 18 and 20 below the value 2 $Z_0$.

Current driver 38 and transformer 34 supply balanced, opposite-polarity, push-pull current pulses to the terminals 18, 20 of the conductor pair 8, 10. Since the secondary coil 32 and the conductors 8, 10 are floating, that is, not referenceed to ground except through impedance 16, it is insured that equal currents will flow in opposite directions through the two conductors 8, 10. During the writing of a "1" information bit, the current through the top conductor 8 may be to the right, with an exactly equal current through the lower conductor 10 to the left. The writing of a "0" information bit may be accomplished by the absence of pulses from driver 38, or by push-pull pulses of polarity opposite that used for writing a "1." All along the lengths of the conductors 8, 10, the voltages on the conductors are equal, opposite, and balanced with relation to the ground plane 17. This being so, the equal and opposite drive currents in the two conductors 8, 10 produce no voltage at the common end terminal 14, and cause no current to flow through terminating impedance 16.

When the equal and opposite drive current pulses are supplied to the terminals 18 and 20, initially half of the current goes through the conductors 8, 10, and the other half of the current goes through the impedances 22 and 24. (After a short time determined by propagation delay, substantially all the current goes through the conductor 8, 10.) Since equal and opposite currents flow through the equal resistors 22, 24, the centertap 26 remains at substantially zero potential. It is thus apparent that the described digit-sense system is constructed in such a balanced manner as to maintain the centertap 26 and the terminal 14 at substantially the zero potential of the ground plane 17 during the application of digit pulses for the writing of information into a memory element.

The presence of the conductive ground plane 17 between or in close proximity to the digit-sense conductors 8 and 10 reduces the inductance of the conductors, and thereby reduces the back voltage which must be overcome by the digit driver 38. Consequently, a lower power and less expensive digit driver may be employed than would be otherwise required. This advantage obtained by the inclusion of ground plane 17 is not accompanied by the usual disadvantage of having noise disturbances generated in the memory due to return currents flowing in the ground plane. Disturbing return currents do not flow in the ground plane because the digit drive to conductors 8, 10 is a push-pull drive balanced with respect to the ground plane throughout the length of the conductors 8, 10.

The conductors 8, 10 to which the digit drive pulses are applied when information is written into a core are also used when information is read from a core to convey a sense signal to a sense amplifier 40. An input of the sense amplifier 40 is connected over line 42 to the centertap 26 of the resistors 22 and 24. The sense amplifier 40 is preferably a differential sense amplifier having another input 44 connected to a point of reference potential which, in FIG. 1, is system ground. The sense amplifier 40 therefore responds to signals applied to input 42 which differ in voltage from the voltage of the reference potential or ground. Since the centertap 26 to which the sense amplifier input 42 is connected is a point which remains at substantially zero potential during the application of a digit pulse from driver 38, the sense amplifier is relatively unaffected by the large voltages applied to the conductor pair 8, 10 during the writing of information. The arrangement is therefore one in which the time required for the sense amplifier to recover following the writing of information is greatly reduced. This permits a corresponding reduction in the memory read-write operating cycle time.

The reading of information is accomplished by sensing the presence or absence of a sense signal on one of the conductors 8, 10 when a read pulse is applied through a word conductor (not shown) linking at least one of the cores 12. If the read pulse causes a switching of a core 12 along conductor 8, a 2 v. sense signal is generated at the selected core and this results in +v. and −v. signals propagated in opposite directions along the conductor 8. Using arbitrary polarities, the positive portion of the sense signal +v. is propagated to the left along conductor 8, and the negative portion −v. is propagated to the right.

The portion −v. of the sense signal propagated to the right encounters an impedance discontinuity at point 14 due to the $Z_0/2$ resistor 16. This discontinuity results in a signal +v./2 reflected back along conductor 8, and a signal −v./2 transmitted along conductor 10. When these two equal and opposite signals reach points 18 and 20, respectively, they cancel each other in resistors 22 and 24, and no voltage appears at centertap 26.

The portion +v. of the sense signal propagated to the left encounters an impedance discontinuity at point 18 due to the two series-connected $Z_0$ resistors 22 and 24. This discontinuity results in a +v./2 signal reflected back along conductor 8 and a +v./2 signal transmitted to the right from point 20 along conductor 10. When these two same-polarity +v./2 signals reach the $Z_0/2$ termination 16, they are completely absorbed.

Now, returning to the time when the propagated +v. portion of the sense signal reaches the point 18, the +v. portion exists at point 18 at the same moment that the +v./2 signal is reflected back along conductor 8. Therefore, the momentary voltage at point 18 is +1.5 v. At the same time, since there is no propagation delay in resistors 22 and 24, a voltage +v. appears at the centertap 26, and the previously-mentioned voltage +v./2 appears at terminal 20 from which it is propagated along conductor 10.

The +v. sense signal momentarily present at the centertap 26 is a voltage relative to ground which is coupled over lead 42 to one input of the sense amplifier 40. The amplifier 40 is preferably a differential sense amplifier having another input 44 connected to a point of reference potential such as ground. The sense amplifier is strobed to respond in the usual manner at an appropriate time following the leading edge of the read pulse when the sense signal will appear at the sense amplifier. The sense amplifier is thus maintained as non-responsive is possible to noise disturbances occurring at other times.

To summarize, the centertap 26 is a point at which, during writing, the push-pull digit drive pulses from driver 38 are cancelled and produce substantially zero voltage. Therefore, the sense amplifier 40 is not choked by a large amplitude drive signal, and does not require the allocation of a corresponding long recovery period before it can correctly respond to a relatively very small sense signal. During reading, the centertap 26 is a point at which the sense signal appears, and from which the sense signal is applied to an input of a sense amplifier referenced to ground The terminating resistors 16, 22 and 24 are proportioned and arranged to prevent multiple reflections of the sense signal and other residual noise disturbances. The described construction is thus very quiet at the input to the sense amplifier because (1) drive noise is substantially cancelled, and (2) reflections are effectively absorbed. This permits the memory read-write operating cycle time to be much shorter than would otherwise be practical.

Figure 2:
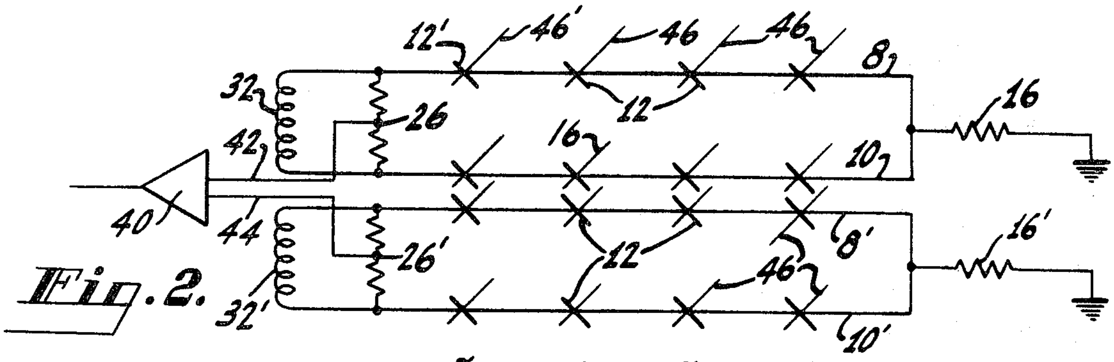
FIG. 2 is a diagram of a one-digit portion of a word-organized memory, the portion shown including two of the elemental digit circuits shown in FIG. 1.

Reference is now made to FIG. 2 showing a one-digit portion of a word-organized or two-dimensional (2D) memory including two of the digit-sense conductor pairs shown in FIG. 1. One digit-sense pair includes conductors 8 and 10, and a second digit-sense conductor pair includes conductors 8' and 10'. The several memory elements or magnetic cores 12 linked by the digit-sense conductors are also linked by respective word lines 46. The cores 12 shown in FIG. 2 are used for the storage of corresponding information bits of an equal number of information words. Additional systems like the one shown in FIG. 2 are disposed along the word lines 46 for additional digits or bits of the words.

The centertap 26 of the digit-sense conductor pair 8, 10 is connected to one input of a differential sense amplifier 40, and the centertap 26' of the digit-sense conductor pair 8', 10' is connected to the other input of the differential sense amplifier 40.

In the operation of a word organized memory of which a one-digit portion is shown in FIG. 2, only one at a time of the word lines 46 is energized, first for reading and then for writing. If the word line 46' is selected, a read pulse of one polarity is directed through the word line 46'. This causes the reading out of the information stored in the magnetic core 12'. If a sense signal is induced in the conductor 8, it is propagated to the centertap 26, and from there to the input 42 of the differential sense amplifier 40, in the manner which has been described in connection with FIG. 1. The other input 44 of the differential sense amplifier 40 is connected to the centertap 26' of the digit-sense pair 8', 10'. There are no sense signals induced on the pair 8', 10' at this time, and the potential of the centertap 26' is at the reference or ground potential, as can be seen from the symmetry of the conductor pair in relation to the resistor 16' having one end connected to ground.

When it is desired to write into the magnetic core 12' in FIG. 2, an opposite polarity write pulse is applied to the word line 46'. Simultaneously therewith, a push-pull digit drive signal is applied from secondary coil 32 through the digit-sense pair 8, 10 for the writing of the "1." The coincident write and digit pulses cause a switching of the core 12'. The writing of a "0" is accomplished by omitting the push-pull digit drive signal, so that the core 12' remanis in the "0" state to which it was set by the read pulse. The cores along the conductor 10 are not switched because the push-pull digit drive signal has insufficient amplitude, acting alone, to switch the cores.

The writing of information into the core 12', as described, involves the application of push-pull digit drive pulses from secondary coil 32 to the conductor pair 8, 10. If desired, to reduce the amount of electronics needed for selection purposes, an unneeded push-pull digit drive may be simultaneously applied, from a common source, to and from secondary coil 32' to the other digit-sense conductor pair 8', 10'. In either case, the centertaps 26 and 26' remain at substantially zero potential despite the presence or absence of push-pull digit drive pulses on the conductor pairs. The sense amplifier 40 is thus not subjected to large input pulses from which it can recover only after the passage of an appreciable period of time.

Figure 3:
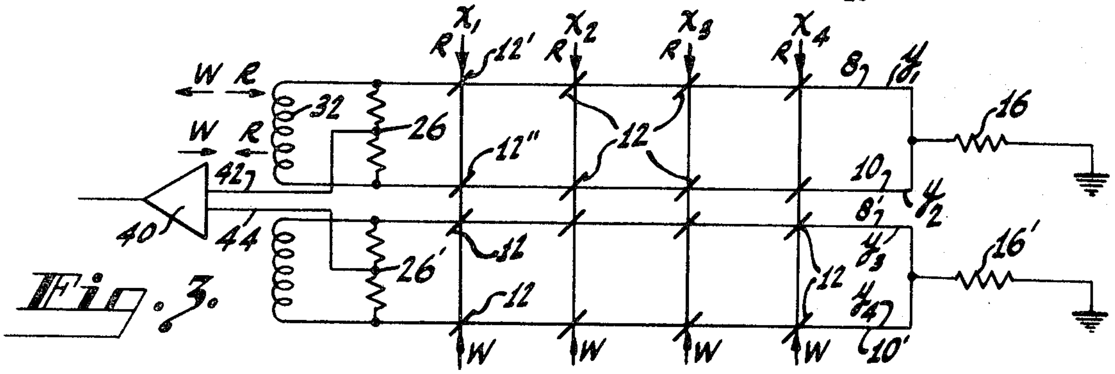
FIG. 3 is a diagram of a one-digit portion of a two-and-a-half dimension (2½D), 2-wire memory including two of the elemental digit circuits shown in FIG. 1.

Reference is now made to FIG. 3 for a description of a one-digit portion of a 2½ dimension, or 2½D, 2-wire "mass" memory incorporating two of the digit-sense pairs shown in FIG. 1. The arrangement of FIG. 3 is similar to the arrangement of FIG. 2 except that column wires labeled $x_1$, $x_2$, $x_3$ and $x_4$ are arranged to link all of the magnetic cores 12 in respective columns. The digit-sense conductors 8, 10, 8' and 10' are respectively labeled $y_1$, $y_2$, $y_3$ and $y_4$, in accordance with the conventional manner of identifying conductors in a 2½D memory.

In the operation of the 2½D memory of FIG. 3, the reading of information stored in a magnetic core 12' is accomplished by applying push-pull digit pulses in the direction labeled R from the secondary coil 32 through the conductor pair $y_1$, $y_2$. After a slight delay, which may be very short, a read pulse is applied through the column conductor $x_1$ in the direction R. The read pulse applied through the column conductor $x_1$ causes the switching of core 12' if a "1" was stored, and this causes a sense signal to be induced on the conductor $y_1$ and be propagated to the centertap 26 and from there to the input 42 of differential sense amplifier 40. To read the information stored in core 12'', the polarity of either the push-pull drive pulses in the $y$ conductors, or the current in the $x$ conductors is reversed. The fact that the centertap 26 remains at substantially zero potential throughout the application of push-pull selection currents to conductors $y_1$, $y_2$ greatly improves the reliability and permissible speed of operation of a 2½D memory constructed according to FIG. 3.

In order to write a "1" into the core 12' in FIG. 3, push-pull write signals having a direction labeled W are applied to the conductor pair $y_1$, $y_2$ simultaneously with the application of a write pulse through the column conductors $x_1$ in the direction labeled W. To write a "1" into core 12'', the polarity of the push-pull digit drive in the $y$ conductors, or the current in the $x_1$ conductor, is reversed. During the course of the described reading from one of the cores 12', 12'' and writing into one of the core 12', 12'', the state of the other one of the cores remains unaffected. This is because, in both cases, the current pulses going through the other one of the cores are in opposite cancelling relation to each other. To write a "0," push-pull drive is omitted.

Figure 4:
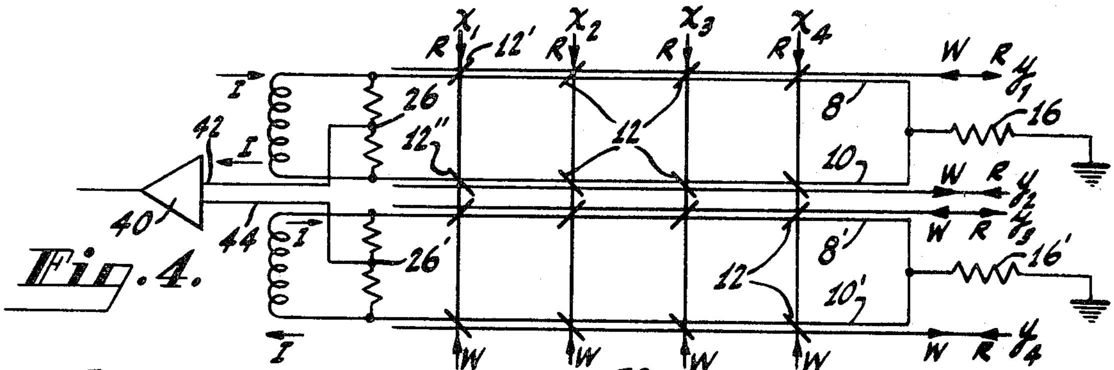
FIG. 4 is a diagram of a one-digit portion of a three dimension (3D, 3-wire memory, including two of the elemental digit circuits shown in FIG. 1.

Reference is now made to FIG. 4 for a description of the present invention as applied to a one-digit portion of a three-dimensional (3D) or coincident-current memory of the 3-wire type where one set of wires is used for both inhibiting and sensing. The system in FIG. 4 differs from the one in FIG. 3 in that an additional set of conductors is provided extending parallel with the conductors of the pairs 8, 10 and 8', 10'. These additional conductors are labeled $y_1$, $y_2$, $y_3$ and $y_4$. An individual core 12' is accessed for reading by applying a pulse in the direction R through column conductor $x_1$ simultaneously with the application of a pulse through the row conductor $y_1$ in the direction R. These two pulses have a sufficient combined amplitude to switch the core 12' and cause a sense signal to be propagated to centertap 26, and from there to input 42 of the sense amplifier 40. The core 12'' can be accessed for reading by energizing conductors $x_1$ and $y_2$ in the R directions.

When it is desired to write a "1" into the core 12', a pulse is applied through the column conductor $x_1$ in the direction W, and a pulse is applied through the row conductor $y_1$ in the direction W, with a combined amplitude sufficient to set the core 12' to the "1" state. If, on the other hand, it is desired to write a "0," push-pull inhibit pulses having the direction labeled I are applied from the secondary coil 32 through the digit conductor pair 8, 10 to inhibit the switching of core 12'. The core 12'' is not affected in either case because the pulses therethrough on conductors $x_1$ and 10 are in opposite and cancelling directions.

When it is desired to write a "1" into the core 12'' pulses are applied through the conductors $x_1$ and $y_2$ in the W direction. To write a "0" into core 12'', switching is inhibited by push-pull inhibit pulses through conductors 8, 10. In either case, the core 12' is unaffected because the pulses therethrough on conductors $x_1$ and 8 are in opposite and cancelling directions.

The three-dimensional organization of FIG. 4 has the advantages of the previously-described arrangements in that the inputs to the sense amplifier 40 are substantially isolated from the drive pulses applied to the memory for the purpose of selecting a desired core and for the purpose of writing information into a desired core.

Figure 5:
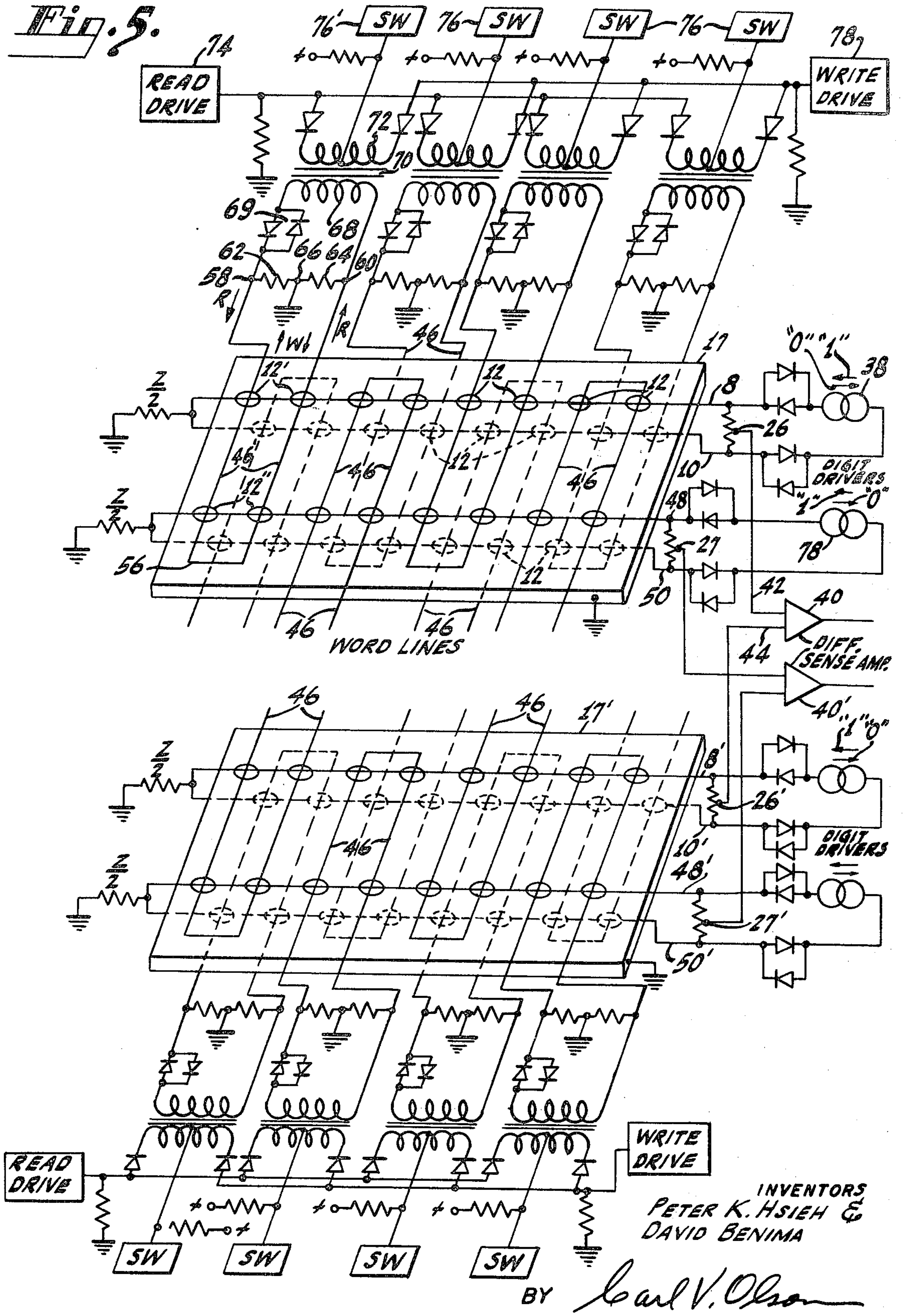
FIG. 5 is a diagram of a two-digit portion of a two-core-per-bit, word-organized memory including four of the circuits of FIG. 1, and including word lines together with read-write driver means.

Reference is now made to FIG. 5 for a description of a two-digit portion of a word-organized two-core-per-bit or two-element-per-bit memory incorporating digit-sense systems according to FIG. 1. All references herein to "cores" are intended to apply to magnetic memory elements in general, including memory elements formed by magnetic film on wire. A digit sense conductor pair 8, 10 links cores 12 arranged above and below a conductive ground plane 17. The conductor pair 8, 10 is provided with terminating impedances and digit drive means exactly the same as has been described in connection with FIG. 1. A digit-sense conductor pair 8′, 10′ is similarly connected and arranged in relation to magnetic cores arranged above and below a conductive ground plane 17′. A differential sense amplifier 40 has one input connected to the centertap 26 of the digit-sense pair 8, 10, and has another input connected to the centertap 26′ of the digit-sense pair 8′, 10′. The differential sense amplifier 40 is thus connected to two digit-sense pairs in exactly the same manner as has been described in connection with FIG. 2.

An additional digit-sense pair 48, 50 is similarly arranged in relation to the conductive ground plane 17, and an additional digit-sense pair 48′, 50′ is similarly arranged in relation to the conductive ground plane 17′. These two additional digit-sense pairs are coupled in the same manner to a second differential sense amplifier 40′. When any one word storage location in the memory is accessed for reading out the stored word, one digit of the accessed word is provided at the output of differential sense amplifier 40, and a second digit of the accessed word is provided at the output of differential sense amplifier 40′. Of course, in an actual memory, there will be a larger number of digit-sense systems for a correspondingly larger number of information bits in each word storage location.

Figure 6:
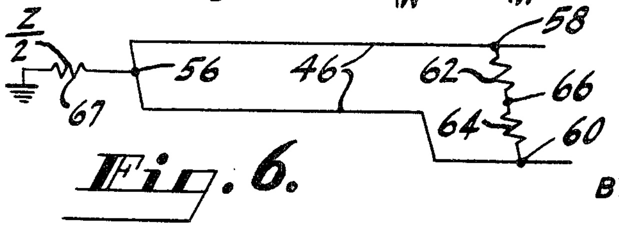
FIG. 6 is a diagram of a word line termination arrangement that may be substituted for the one shown in FIG. 5.

In FIG. 5, each word line 46 consists of a pair of conductors connected together at one end 56 and having separate opposite driven ends 58 and 60. The driven ends 58 and 60 are connected by two series resistors 62 and 64 each having a value equal to the characteristic impedance Z with respect to ground of an individual conductor of the pair, and having a centertap 66 connected to a point of reference potential such as ground. An alternative construction of each word line 46 is shown in FIG. 6, where the centertap 66 is not connected to ground, but rather, the common end 56 of the word conductors is connected to ground through a resistor 67 having a value equal to one-half the characteristic impedance of an individual conductor of the pair.

Each word conductor pair is driven in push-pull from a secondary 68 of a transformer 70. A pair of parallel, oppositely-poled diodes 69 is connected in series with secondary coil 68 to recover the transformer, that is, to provide direct current restoration of the transformer and prevent a building up of voltage due to the difference in amplitude of the opposite-polarity read and write pulses applied to the word line. The transformer 70 has a centertapped primary winding 72 which is connected in a conventional manner to word selection and driver means including a read driver 74, switches 76 and a write driver 78.

All of the other word lines in FIG. 5 are similarly connected, although the connections to some of the word lines are omitted from the drawing for reasons of clarity of illustration. The word lines 46 are preferably arranged so that the driven ends are on alternating side edges of the ground plane 42, as shown, for the purpose of simplifying space and connection problems.

FIG. 5 shows sixteen word lines 46, along each of which are stored two information bits. Only one word line is accessed at a time for reading and writing. Two cores or memory elements 12 are used for the storage of each information bit. For example, the two cores 12′ are used for the storage of one information bit along the word line 46′, and the two cores or memory elements 12″ are used for the storage of another information bit along the same word line. Only one of the sixteen word lines shown in the drawing is accessed at a time for the reading-out of information stored in the two information bit storage locations of the word, and then for writing into the two information bit storage locations of the word.

The operation of the two-dimensional two-core-per-bit memory system of FIG. 5 will now be described. If the word line 46′ is to be accessed, the switch 76′ and the read driver 74 are energized to produce a push-pull drive through the transformer 70 to the drive ends 58 and 60 of the word line 46′ in the "read" directions labeled R. The two opposite-direction read pulses applied through the two cores 12′ results in the inducing on digit conductor 8 of two opposite-polarity sense signals. The two sense signals from the two cores 12′ partially cancel each other in conductor 8 and results in a net sense signal having one polarity or the other depending on whether the information stored was a "1" or a "0." The net sense signal is then propagated along the digit-sense conductor 8 to the sense amplifier 40 which produces a "1" or a "0" output signal.

At the same time, a net sense signal is induced from the two cores 12″ onto the digit-senes conductor 48 and applied to the differential sense amplifier 40′. The amplifier 40′ thus simultaneously provides an output indicating whether the other information bit of the accessed word is a "1" or a "0." The operation of each digit-sense system in FIG. 5 is the same as has been described in connection with the other figures, with the difference that the system of FIG. 5 has the added noise cancellation and speed advantages of a two-core-per-bit arrangement.

The word line arrangement shown in FIG. 5 is particularly advantageous in that word drive disturbances in the memory are minimized. The word line conductor pairs, being driven in push-pull, carry symmetrical, balanced, cancelling voltages throughout their length. The balanced conditions on the word lines prevent the appearance of currents between the ground plane and the circuit grounds of the drivers, which in prior arrangement produce noise disturbances throughout the memory. Also, the undesired capacitive coupling from a driven word line to a digit-sense line is cancelled by reason of the equal and opposite polarities of the voltages on the two conductors of the word line. This noise cancellation is achieved without the generation of disturbing currents in the ground plane. These most important noise cancellation features are provided in a memory which permits the inclusion of a ground plane without the attendant noise disadvantages due to currents flowing in the ground plane. The inclusion of a ground plane has the advantage of reducing the inductance of the word lines. Therefore, the back voltages developed are relatively low, and the requirements on the word drivers are correspondingly reduced.

After the read-out of the two information bits from the accessed word line, as described, information is written back into the two bit storage locations on the word line. The switch 76′ is maintained in the energized condition, and the write driver 78 is energized to produce a push-pull drive through the appropriate word line 46′ in the directions labeled W. Concurrently therewith, the digit driver 38 is energized to supply a push-pull digit pulse through digit-sense conductors 8, 10. The push-pull drive has a direction labeled "1" if it is desired to store a "1." The digit and write pulses through one of the cores 12′ are in additive directions and through the other one of the cores 12′ are in subtractive directions. If it is desired to store a "0" in the two cores 12′, the direction of the push-pull drive from driver 38 is reversed. This causes the additive and subtractive relations in the two cores 12′ to be reversed.

At the same time that an information bit is written into the two cores 12′, an information bit is also written into the two cores 12″ along the same accessed word line 46. This is accomplished by energizing the push-pull digit driver 78 to supply a push-pull drive through digit-sense conductors 48, 50 in one polarity or the other depending on whether a "1" or a "0" is to be written into the cores 12''.

The push-pull read pulses, and also the push-pull write pulses, applied to the selected word line 46' are substantially balanced in relation to the digit conductors 8, 10, 48 and 50, so that substantially no noise is capacitively or inductively coupled therethrough to the inputs of the sense amplifiers 40, 40'. Also, the push-pull digit drives applied to the digit-sense pairs 8, 10 and 48, 50 are substantially balanced to zero at the centertaps 26, 27, and are thus not coupled to the inputs to the sense amplifiers 40, 40'. The word organized two-core-per-bit memory system illustrated in FIG. 5 is one in which the inputs to the sense amplifiers are substantially noise free, so that the memory, even in large sizes, can be operated with a memory cycle time of about one hundred nanoseconds, or one-tenth of a microsecond.

What is claimed is:

1. In a random-access magnetic memory, the combination of

- a plurality of digit-sense conductor pairs each including two conductors having a common terminated end and having separate drive-sense ends,
- a first impedance connected from said common terminated end of each pair to a point of reference potential,
- a second centertapped impedance connected between said separate drive-sense ends of each pair,
- digit drive means connected for supplying balanced push-pull digit drive current pulses to the drive-sense ends of the two conductors of digit-sense conductor pairs, and
- a plurality of sense amplifiers each having an input connected to a centertap of a second impedance of a digit-sense conductor pair.

2. A memory as defined in claim 1 wherein said first impedance has a value equal to one-half the characteristic impedance of one conductor of said pair.

3. A memory as defined in claim 1 wherein said second centertapped impedance has a total value equal to twice the characteristic impedance of one conductor of said pair.

4. A memory as defined in claim 2 wherein said second centertapped impedance has a total value equal to twice the characteristic impedance of one conductor of said pair.

5. A memory as defined in claim 4 wherein each of said sense amplifiers is a differential sense amplifier.

6. A memory as defined in claim 1 wherein each of said sense amplifiers is a differential sense amplifier having a second input connected to the centertap of a second impedance of another digit-sense conductor pair.

7. A memory as defined in claim 1 wherein said digit drive means is transformer coupled to said digit-sense conductors.

8. A memory as defined in claim 1 and, in addition, a conductive ground plane means located in close proximity with the two conductors of said digit-sense conductor pairs.

9. A memory as defined in claim 8 wherein said ground plane means is located between the two conductors of said digit-sense conductor pairs.

10. In a random-access magnetic memory for the storage of a plurality of information words, a digit-sense system for one information bit of the words, comprising

- two digit-sense conductor pairs, each pair including two conductors having a common terminated end and having separate drive-sense ends,
- a plurality of memory elements along said conductors,
- two first impedances each having a value equal to one-half the characteristic impedance of one conductor connected from said common terminated end of a respective pair to a point of reference potential,
- two second impedances each having a centertap and having a total value equal to twice the characteristic impedance of one conductor connected between said separate drive-sense ends of a respective pair,
- digit drive means connected for supplying balanced push-pull digit drive current pulses to the drive-sense ends of the two conductors of digit-sense conductor pairs, and
- a differential sense amplifier having one input connected to a centertap of the second impedance of one digit-sense conductor pair, and having a second input connected to the centertap of the second impedance of the other digit-sense conductor pair.

11. The combination defined in claim 10, and in addition, a plurality of word lines each linking a respective one of said memory elements, whereby to provide a word-organized memory.

12. The combination defined in claim 10, and in addition, a plurality of selection lines each linking one memory element along each of the four digit-sense conductors, whereby to provide a 2½ dimension, 2-wire memory.

13. The combination defined in claim 12, and in addition, a second plurality of selection lines each linking memory elements linked by a respective one of said digit-sense conductors, whereby to provide a three-dimension, 3-wire memory.

14. In a magnetic memory, means for storing one information bit of each of a plurality of information words comprising

- two digit-sense conductor pairs, each pair including two conductors having a common terminated end and having separate drive-sense ends for receiving push-pull digit drive current pulses,
- a plurality of memory elements along said conductors,
- two first impedances each having a value equal to one-half the characteristic impedance of one conductor connected from said common terminated end of a respective pair to a point of reference potential,
- two second impedances each having a centertap for connection to an input of a sense amplifier, having a total value equal to twice the characteristic impedance of one conductor, and being connected between said separate drive-sense ends of a respective pair, and
- a plurality of word lines each linking a respective memory element.

15. The combination defined in claim 14, and in addition, conductive ground plane means located in close proximity to said digit-sense and word line conductors.

References Cited

UNITED STATES PATENTS

| | | | |
|---|---|---|---|
| 3,181,132 | 4/1965 | Amemiya | 340—174 |
| 3,209,337 | 9/1965 | Crawford | 340—174 |
| 3,404,387 | 10/1968 | Amemiya | 340—174 |

OTHER REFERENCES

Proceedings of the IEE; Fall Joint Computer Conference Proceedings, "An Improved Union of Digit-Select Lines and Sense Lines in Word-Select Ferrite-Core Memory Systems," April 1964, pp. 432–433.

IBM Technical Disclosure Bulletin, "Quarter Point Sensing" by Kwei; vol. 7, No. 12, May 1965, p. 116.

STANLEY M. URYNOWICZ, Jr., Primary Examiner